(12) United States Patent
Ito et al.

(10) Patent No.: US 10,801,554 B2
(45) Date of Patent: Oct. 13, 2020

(54) MULTIPLATE FRICTION CLUTCH

(71) Applicant: HONDA MOTOR CO., LTD., Minato-Ku, Tokyo (JP)

(72) Inventors: Yoichi Ito, Wako (JP); Akira Takahashi, Wako (JP); Kinya Mizuno, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 11 days.

(21) Appl. No.: 16/230,040

(22) Filed: Dec. 21, 2018

(65) Prior Publication Data

US 2019/0211886 A1 Jul. 11, 2019

(30) Foreign Application Priority Data

Jan. 10, 2018 (JP) .................................. 2018-002237

(51) Int. Cl.
*F16D 13/54* (2006.01)
*F16D 23/12* (2006.01)
(Continued)

(52) U.S. Cl.
CPC ............. *F16D 13/54* (2013.01); *F16D 13/56* (2013.01); *F16D 13/70* (2013.01); *F16D 23/12* (2013.01);
(Continued)

(58) Field of Classification Search
CPC .......... F16D 13/54; F16D 13/56; F16D 13/70; F16D 13/71; F16D 2013/565; F16D 2023/123; F16D 23/12
See application file for complete search history.

(56) References Cited

U.S. PATENT DOCUMENTS

| 5,617,938 A | 4/1997 | Tsukada et al. |
| 9,580,060 B2 | 2/2017 | Nonaka et al. |
(Continued)

FOREIGN PATENT DOCUMENTS

| CN | 202914573 U | 5/2013 |
| EP | 3181933 A1 | 6/2017 |
(Continued)

OTHER PUBLICATIONS

Official communication dated Oct. 23, 2019 issued over the corresponding Japanese Patent Application No. 2018-002237.
(Continued)

*Primary Examiner* — Jacob S. Scott
(74) *Attorney, Agent, or Firm* — Carrier Blackman & Associates, P.C.; Joseph P. Carrier; Jeffrey T. Gedeon

(57) ABSTRACT

A multiplate friction clutch includes: a pressure plate having a boss portion which penetrates a clutch center; a clutch lifter plate joined to the boss portion and receiving a drive force in a axial direction at a time of disconnection between a friction plate and a clutch plate; and a spring sandwiched between the clutch lifter plate and the clutch center, and capable of generating an elastic force in a direction that the friction plate and the clutch plate are pressed to each other. A position restricting portion is provided on the clutch lifter plate, the position restricting portion being brought into contact with the boss portion from an outside in a radial direction of the clutch lifter plate so as to restrict a position of the clutch lifter plate with respect to the pressure plate.

6 Claims, 8 Drawing Sheets

(51) Int. Cl.
  *F16D 13/70*  (2006.01)
  *F16D 13/56*  (2006.01)
(52) U.S. Cl.
  CPC .. *F16D 2013/565* (2013.01); *F16D 2023/123* (2013.01)

(56) References Cited

U.S. PATENT DOCUMENTS

| | | | |
|---|---|---|---|
| 2014/0235407 A1* | 8/2014 | Nonaka | F16D 13/54 |
| | | | 477/181 |
| 2016/0333943 A1* | 11/2016 | Chiba | F16H 3/091 |
| 2018/0031054 A1* | 2/2018 | Imanishi | F16D 13/52 |
| 2019/0017554 A1 | 1/2019 | Isobe et al. | |

FOREIGN PATENT DOCUMENTS

| | | | |
|---|---|---|---|
| JP | 2002-295513 A | 10/2002 | |
| JP | 2007-078088 A | 3/2007 | |
| JP | 4133617 B2 | 8/2008 | |
| JP | 2013-096421 A | 5/2013 | |
| JP | 2017-133530 A | 8/2017 | |
| WO | 2016/024557 A1 | 2/2016 | |
| WO | 2017/168615 A1 | 10/2017 | |

OTHER PUBLICATIONS

Extended European search report issued in the corresponding EP patent application No. 19150658.3.

\* cited by examiner

MULTIPLATE FRICTION CLUTCH

BACKGROUND OF THE INVENTION

Field of the Invention

The present invention relates to a multiplate friction clutch which includes: a pressure plate assembled to a clutch center in a relatively rotatable manner about an axis and in a relatively displaceable manner in an axial direction, and having a boss portion which penetrates the clutch center; a cam mechanism disposed between the pressure plate and the clutch center, and capable of generating a relative displacement in an axial direction between the pressure plate and the clutch center in response to a relative rotation about the axis between the pressure plate and the clutch center; a clutch lifter plate joined to the boss portion and receiving a drive force in the axial direction at a time of disconnection between the friction plate and the clutch plate; and a spring sandwiched between the clutch lifter plate and the clutch center, and capable of generating an elastic force in a direction that the friction plate and the clutch plate are pressed to each other.

Description of the Related Art

Japanese Patent No. 4133617 discloses a multiplate friction clutch which includes: a clutch outer supported by a rotary shaft in a relatively rotatable manner about an axis and holding friction plates; and a clutch inner disposed in an inner space of the clutch outer, fixed to the rotary shaft, and holding clutch plates which are brought into contact with the friction plates. A pressure plate is assembled to the clutch inner in a relatively displaceable manner in an axial direction such that the friction plates and the clutch plates are sandwiched between the clutch inner and the pressure plate. The pressure plate has a boss portion which penetrates the clutch inner. A clutch lifter plate which receives a drive force from the clutch lifter in an axial direction at the time of disconnection between the friction plates and the clutch plates is joined to a tip end of the boss portion. When the clutch lifter plate is pushed in an axial direction, a distance between the pressure plate and the clutch inner which faces the pressure plate is increased so that a frictional contact between the friction plates and the clutch plates is disconnected.

A contact surface which expands on a plane orthogonal to the axis of the rotary shaft and receives a spring is formed on the clutch lifter plate. On the contact surface, a reception groove which extends in a circumferential direction of the clutch lifter plate and receives a tip end of a boss portion of the pressure plate is formed. The clutch lifter plate is positioned with respect to the pressure plate due to a contact of an inner side in a radial direction of the boss portion to a wall surface of an inner side in a radial direction of the reception groove. A space which functions as a play is formed in the reception groove on an outer side in a radial direction of the boss portion. Accordingly, to ensure a sufficient contact area between the clutch lifter plate and the spring on the contact surface positioned on an outer side of the reception groove in a radial direction of the clutch lifter plate, the contact surface of the clutch lifter plate is largely expanded toward an outside of the boss portion. As a result, a diameter of the clutch lifter plate becomes large.

SUMMARY OF THE INVENTION

The present invention has been made in view of the above-mentioned circumstances, and it is an object of the present invention to provide a multiplate friction clutch capable of realizing the reduction of a diameter of a clutch lifter plate while sufficiently ensuring a contact area between a clutch lifter plate and a spring.

In order to achieve the first object, according to a first aspect of the present invention, there is provided a multiplate friction clutch comprising: a clutch outer supported by a rotary shaft in a relatively rotatable manner about an axis, and holds a friction plate in a relatively displaceable manner in an axial direction of the rotary shaft; a clutch center supported by the rotary shaft in a relatively non-rotatable manner; a pressure plate assembled to the clutch center in a relatively rotatable manner about an axis and in a relatively displaceable manner in an axial direction, holding a clutch plate, which is brought into contact with the friction plate, in a relatively displaceable manner in the axial direction together with the clutch center, and having a boss portion which penetrates the clutch center; a cam mechanism disposed between the pressure plate and the clutch center, and capable of generating a relative displacement in an axial direction between the pressure plate and the clutch center in response to a relative rotation about the axis between the pressure plate and the clutch center; a clutch lifter plate joined to the boss portion and receiving a drive force in the axial direction at a time of disconnection between the friction plate and the clutch plate; and a spring sandwiched between the clutch lifter plate and the clutch center, and capable of generating an elastic force in a direction that the friction plate and the clutch plate are pressed to each other, wherein a position restricting portion is provided on the clutch lifter plate, the position restricting portion being brought into contact with the boss portion from an outside in a radial direction of the clutch lifter plate so as to restrict a position of the clutch lifter plate with respect to the pressure plate.

With the first aspect of the present invention, the clutch lifter plate can be positioned with certainty with respect to the pressure plate due to an action of the position restricting portion. Accordingly, in assembling the clutch lifter plate, the clutch lifter plate can be brought into contact with and supported (temporary fixing) by the pressure plate at a predetermined position. The position restricting portion is brought into contact with the boss portion from the outside in a radial direction of the clutch lifter plate. Accordingly, a contact surface with the spring which expands toward the outside from the position restricting portion is disposed at a position as close as possible to an axis of the rotary shaft. As a result, it is possible to realize the reduction of a diameter of the clutch lifter plate while sufficiently ensuring a contact area between the clutch lifter plate and the spring.

According to a second aspect of the present invention, in addition to the first aspect, a groove which extends in a peripheral direction of the clutch lifter plate and receives a tip end of the boss portion is formed on the clutch lifter plate, and the groove has: an outer wall surface which is brought into contact with the boss portion from an outside in the radial direction of the clutch lifter plate so as to function as the position restricting portion; a bottom surface which expands radially inward from the outer wall surface, and is brought into contact with a tip end surface of the boss portion; and an inner wall surface which expands while facing the outer wall surface, and faces the boss portion from an inner side in the radial direction of the clutch lifter plate.

With the second aspect of the present invention, the outer side surface and the tip end surface of the boss portion of the pressure plate are brought into contact with the outer wall surface and the bottom surface of the groove respectively.

Accordingly, the clutch lifter plate can be fixed to the pressure plate with certainty in the radial direction and in the axial direction.

According to a third aspect of the present invention, in addition to the second aspect, the inner wall surface of the groove faces the boss portion with a space formed between the inner wall surface and the boss portion.

With the third aspect of the present invention, a space is formed between the inner wall surface of the groove and the inner side surface of the boss portion. Accordingly, size accuracy can be controlled with high accuracy at the outer wall surface which is brought into contact with the boss portion and, at the same time, a size tolerance range can be loosely set at the inner wall surface and hence, the reduction of a part working cost can be realized.

According to a fourth aspect of the present invention, in addition to any one of the first aspect to the third aspect, an accommodating portion which constrains the spring in a plane orthogonal to an axis of the rotary shaft is formed on the clutch center at a position displaced from the boss portion in a peripheral direction, and an outer end of the clutch lifter plate is disposed outside the accommodating portion in the radial direction of the clutch lifter plate.

With the fourth aspect of the present invention, the outer end of the clutch lifter plate is positioned outside the accommodating portion of the spring in the radial direction of the clutch lifter plate. Accordingly, when the clutch lifter plate is rotated about the axis together with the pressure plate relative to the clutch center, even when the clutch lifter plate is displaced with respect to the spring, the clutch lifter plate can continuously support the spring with certainty.

According to a fifth aspect of the present invention, in addition to the fourth aspect, an escape portion is formed on the clutch center, the escape portion being indented in the axial direction of the rotary shaft and receiving an outer end of the clutch lifter plate.

With the fifth aspect of the present invention, the outer end of the clutch lifter plate is received by the escape portion and hence, the clutch lifter plate can be made to overlap with the clutch center as much as possible and hence, an assembly formed of the clutch center and the clutch lifter plate can be reduced in size in the axial direction and in the radial direction.

According to a sixth aspect of the present invention, in addition to the first aspect, the pressure plate has: a circular plate element which expands along an imaginary plane orthogonal to the axis of the rotary shaft, supports the boss portion, and has an opening at a position displaced from the boss portion in a peripheral direction; a cam surface which is formed on the circular plate element so as to configure the cam mechanism, faces the opening, and is inclined so as to be away from the spring in a peripheral direction as the cam surface is away from the clutch lifter plate in an axial direction; and an oil discharge surface which is continuously formed from an edge of the opening and is inclined radially outward as the oil discharge surface approaches the edge of the opening.

With the sixth aspect of the present invention, when the pressure plate is rotated, oil on the cam surface moves radially outward due to an action of a centrifugal force, and flows along the oil discharge surface and is discharged to the outside of the pressure plate. Along with the movement of oil, dust in the pressure plate is discharged to the outside of the pressure plate. The oil discharge surface is inclined radially outward as the oil discharge surface approaches the edge of the opening and hence, discharging of oil is accelerated. The stagnation of oil and dust in the pressure plate can be prevented.

According to a seventh aspect of the present invention, in addition to the sixth aspect, the clutch center has: an outer peripheral element which expands radially outward from a bearing portion fixed to the rotary shaft and has a window hole which receives the boss portion and the cam surface of the pressure plate; and an inclined surface which is disposed in the window hole and receives the cam surface by a plane of the inclined surface, and the oil discharge surface is disposed radially inside an outer end in a radial direction of the window hole.

With the seventh aspect of the present invention, in general, a wall surface which is continuously raised from a circular plate element starting from the outer end in the radial direction of the opening is formed on the pressure plate. The wall surface is disposed radially outside of the outer end in the radial direction of the window hole of the clutch center, and large inclination is not imparted to the wall surface. Meanwhile, the oil discharge surface of the pressure plate according to one embodiment of the present invention is disposed radially inside the outer end in the radial direction of the window hole of the clutch center and hence, the oil discharge surface can have the larger inclination than a conventional case. As a result, discharging of oil is accelerated. The stagnation of oil and dust in the pressure plate can be prevented.

The above and other objects, characteristics and advantages of the present invention will be clear from detailed descriptions of the preferred embodiment which will be provided below while referring to the attached drawings.

DESCRIPTION OF THE PREFERRED EMBODIMENT

Hereinafter, one embodiment of the present invention is described with reference to attached drawings. In this specification, directions of up and down, front and rear, and left and right of a vehicle body are defined based on directions as viewed from an occupant riding on a two-wheeled motor vehicle.

Figure 1:
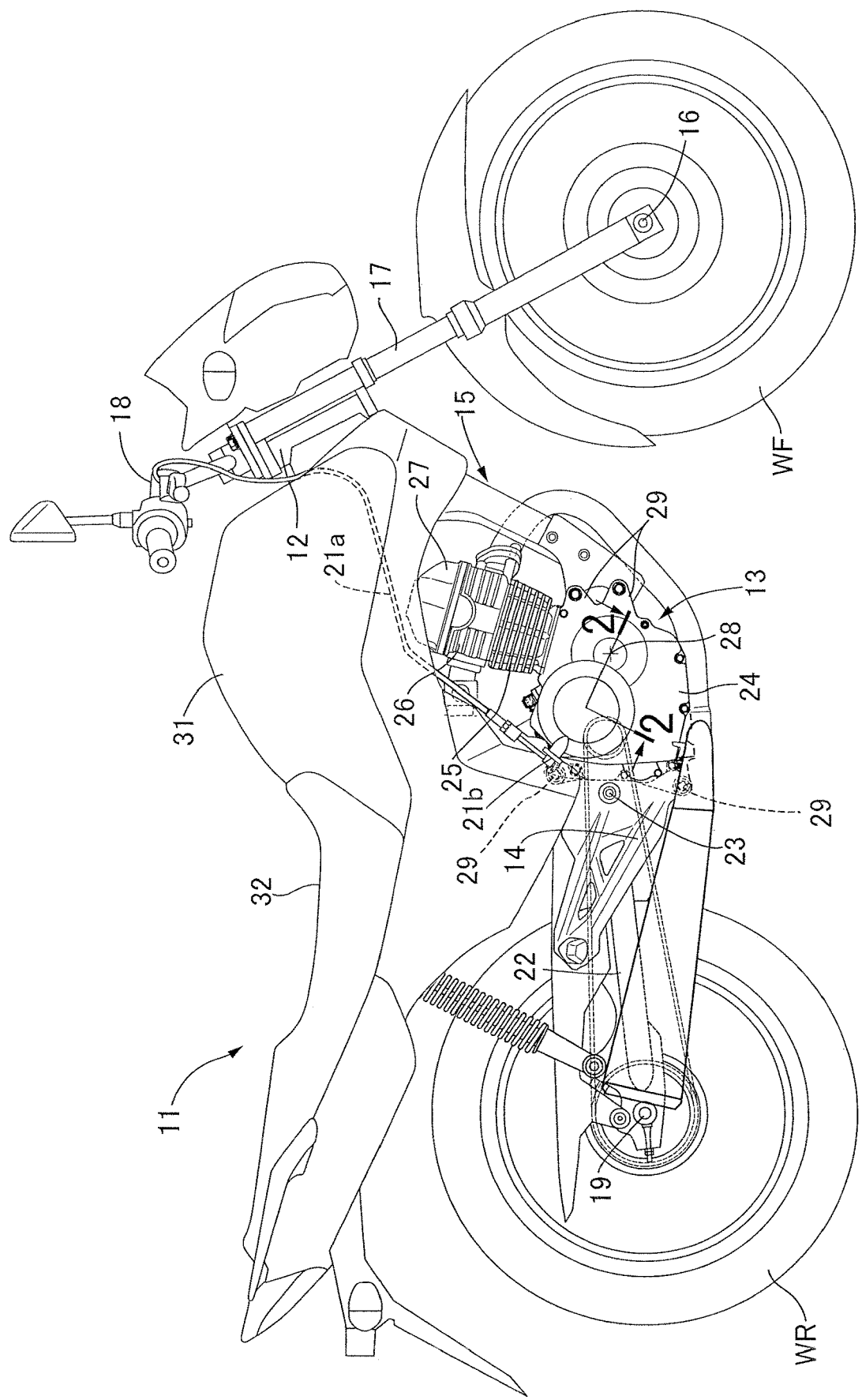
FIG. 1 is a side view schematically showing an overall image of a two-wheeled motor vehicle according to an embodiment of the present invention.

FIG. 1 schematically shows the overall configuration of a two-wheeled motor vehicle according to one embodiment of the present invention. The two-wheeled motor vehicle 11 has a head pipe 12 on a front end thereof, and includes a vehicle frame 15 having a pivot frame 14 behind an internal combustion engine 13. A front fork 17 which supports a front wheel WF in a rotatable manner about an axle 16 is steerably supported by the head pipe 12. A handlebar 18 is joined to the front fork 17 on an upper side of the head pipe 12. A clutch lever which brings about the displacement of a clutch cable 21a in a line direction is mounted on a left grip of the handlebar 18. The clutch cable 21a is connected to a lifter drive shaft 21b (described later) which is driven in a rotatable manner about an axis at an offset position. A swing arm 22 which supports a rear wheel WR in a rotatable manner about an axle 19 is supported by the pivot frame 14 in a swingable manner about a support shaft 23. The support shaft 23 extends horizontally in a vehicle width direction.

The internal combustion engine 13 is mounted on the vehicle frame 15 between the front wheel WF and the rear wheel WR. The internal combustion engine 13 includes: a crankcase 24; a cylinder block 25 which is joined to the crankcase 24, extends upward from the crankcase 24, and has a frontwardly inclined cylinder axis; a cylinder head 26 which is joined to the cylinder block 25; and a head cover 27 which is joined to the cylinder head 26. A crankshaft (described later) which is rotated about a rotation axis 28 extending parallel to the axle 19 of the rear wheel WR is supported by the crankcase 24. A rotational movement of the crankshaft is transmitted to the rear wheel WR through a power transmission device (not shown in the drawing). Two engine hangers 29 are formed on a front side of the crankcase 24, and two engine hangers 29 are formed on a rear side of the crankcase 24. The crankcase 24 is connected and fixed to the vehicle frame 15 by the engine hangers 29.

A fuel tank 31 is mounted on the vehicle frame 15 above the internal combustion engine 13. An occupant's seat 32 is mounted on the vehicle frame 15 behind the fuel tank 31. Fuel is supplied to a fuel injection device of the internal combustion engine 13 from the fuel tank 31. At the time of driving the two-wheeled motor vehicle 11, an occupant strides over the occupant's seat 32.

Figure 2:
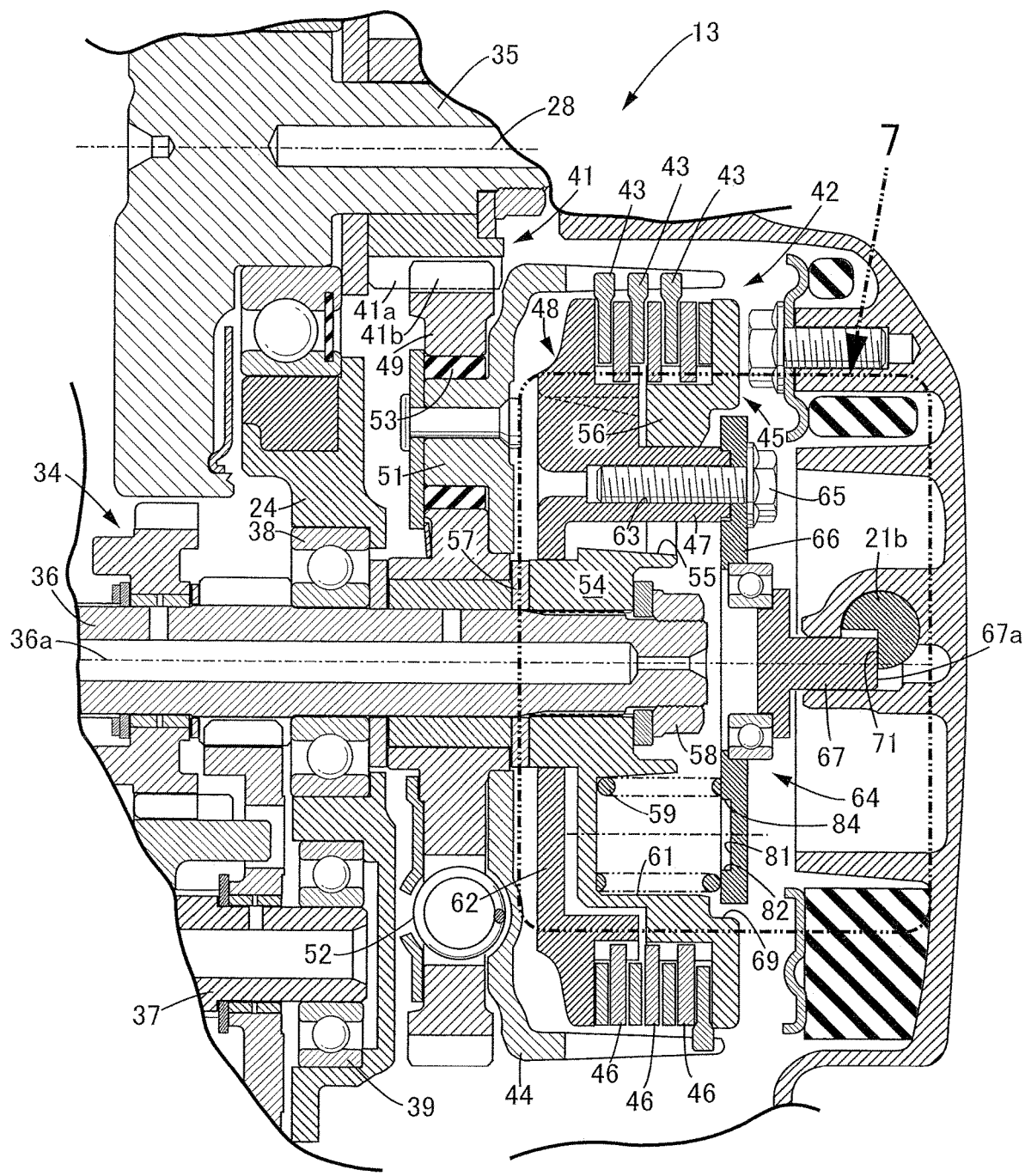
FIG. 2 is an enlarged partial sectional view of an internal combustion engine which appears in a cut surface which includes an axis of a crankshaft and axes of an input shaft and an output shaft of a multi-stage transmission.

As shown in FIG. 2, a dog-clutch-type multi-stage transmission (power transmission device) 34 is incorporated in the internal combustion engine 13. The multi-stage transmission 34 includes an input shaft 36 and an output shaft 37 respectively having an axis parallel to an axis of a crankshaft 35 (=the rotation axis 28). A connecting rod (not shown in the drawing) is connected to a crank of the crankshaft 35 in the inside of the crankcase 24. The connecting rod converts an axial direction movement of a piston (not shown in the drawing) into a rotational movement of the crankshaft 35. Hereinafter, the detailed description of the structure substantially equal to the structure of the general internal combustion engine may be omitted.

The input shaft 36 and the output shaft 37 of the multi-stage transmission 34 are rotatably supported by the crankcase 24 by bearings 38, 39 which are respectively fitted in the crankcase 24. The input shaft 36 is connected to the crankshaft 35 by way of a primary deceleration mechanism 41. The primary deceleration mechanism 41 includes: a drive gear 41a fixed to the crankshaft 35; and a driven gear 41b which is supported by the input shaft 36 in a relatively rotatable manner. The driven gear 41b meshes with the drive gear 41a. The axle 19 of the rear wheel WR is connected to the output shaft 37 by way of a drive chain. In the multi-stage transmission 34, in response to meshing between a plurality of drive gears supported by the input shaft 36 and a plurality of driven gears supported by the output shaft 37, connection states in plural shift stages including a neutral state are selectively switched.

A multiplate friction clutch 42 is incorporated in the internal combustion engine 13. The multiplate friction clutch 42 is formed as a so-called assist slipper clutch. The multiplate friction clutch 42 includes: a clutch outer 44 which is supported by the input shaft (rotary shaft) 36 in a relatively rotatable manner about an axis, and holds friction plates 43 in a relatively displaceable manner in the axial direction of the input shaft 36; a clutch center 45 which is supported by the input shaft 36 in a relatively non-rotatable manner; and a pressure plate 48 which is assembled to the clutch center 45 in a relatively rotatable manner about an axis and in a relatively displaceable manner in the axial direction, holds clutch plates 46, which are brought into contact with the friction plates 43, together with the clutch center 45 in a relatively displaceable manner in the axial direction, and has boss portions 47 which penetrate the clutch center 45. The friction plate 43 and the clutch plate 46 are respectively formed of an annular plate member expanding along an imaginary plane orthogonal to the axis of the input shaft 36. The friction plates 43 and the clutch plates 46 are alternately disposed in the axial direction of the input shaft 36. When the pressure plate 48 and the clutch center 45 approach each other in the axial direction of the input shaft 36, the friction plates 43 and the clutch plates 46 alternately overlap with each other, and are brought into face contact with each other so that a connection state of the multiplate friction clutch 42 is established corresponding to a friction connection. When the pressure plate 48 and the clutch center 45 are moved away from each other in the axial direction of the input shaft 36, the friction plates 43 and the clutch plates 46 are separated from each other, and the friction connection is released so that a disconnection state of the multiplate friction clutch 42 is established. With such a configuration, in the multiplate friction clutch 42, the connection and the disconnection between the clutch outer 44 and the clutch center 45 are switched in response to an operation of the clutch lever mounted on a grip of the handlebar 18.

The clutch outer 44 includes: a clutch gear 49 which holds the above-mentioned driven gear 41b on an outer periphery thereof; and a holding member 51 which is supported by the clutch gear 49 such that a relative angle between the holding member 51 and the clutch gear 49 is changeable about an axis of the input shaft 36, and holds a plurality of friction plates 43 in a displaceable manner in the axial direction of the input shaft 36. The holding member 51 and the clutch gear 49 are rotated relative to each other about the axis within a predetermined angle range. A helical spring 52 and a damper 53 which absorb an impact in the peripheral direction are disposed between the holding member 51 and the clutch gear 49.

The clutch gear 49 meshes with the drive gear 41a mounted on the crankshaft 35. The drive gear 41a is joined to the crankshaft 35 projecting from the crankcase 24 in a relatively non-rotatable manner and hence, the rotation of the crankshaft 35 is transmitted to the clutch gear 49 at a prescribed speed reduction ratio. Power of the crankshaft 35 is transmitted to the holding member 51 about the axis of the input shaft 36 by way of the clutch gear 49. The friction plates 43 are rotated together with the holding member 51.

Figure 3:
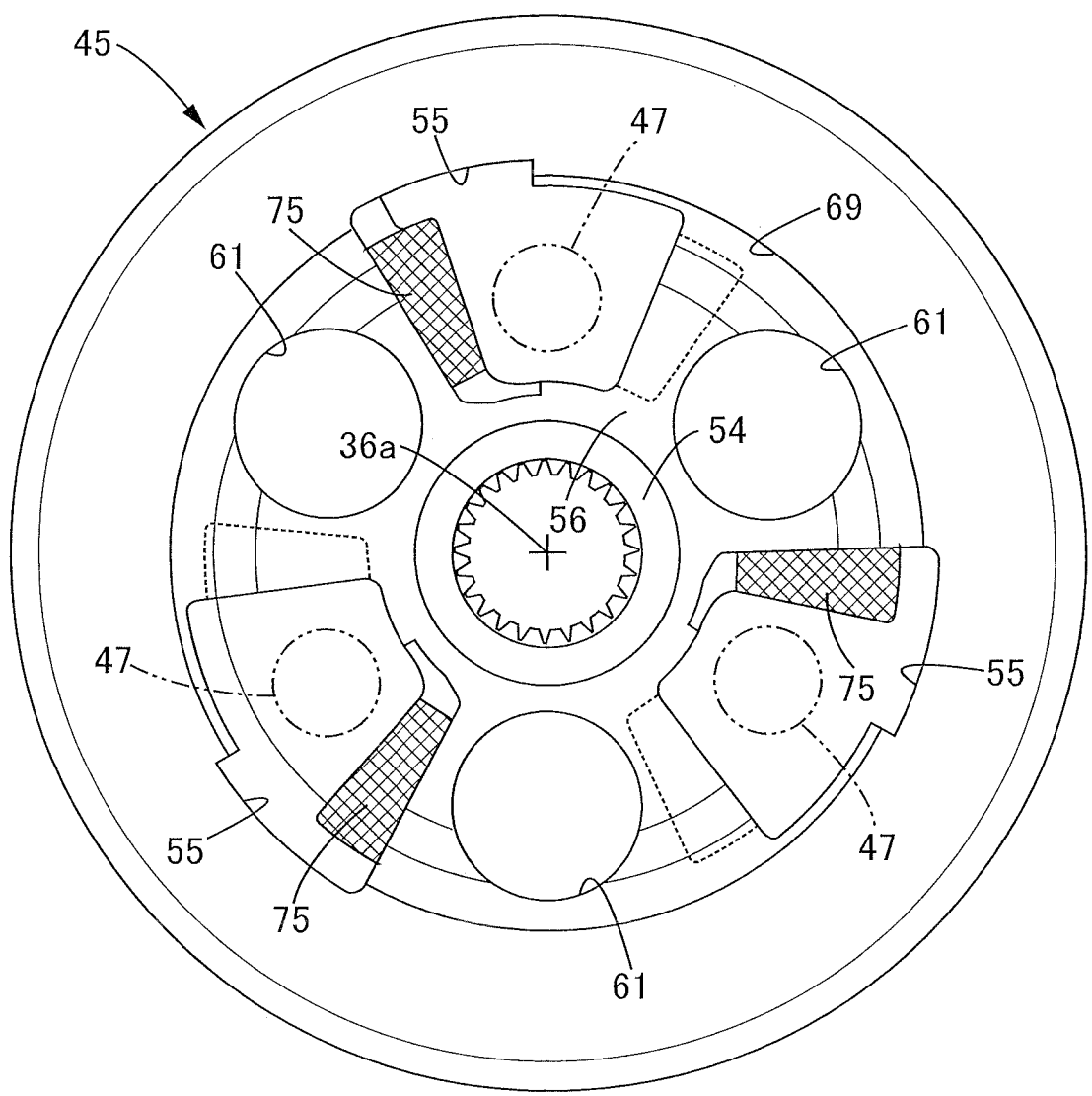
FIG. 3 is an enlarged plan view of a clutch center.

Also with reference to FIG. 3, the clutch center 45 includes: a bearing portion 54 having a circular cylindrical shape which is spline-connected to the input shaft 36; and an outer peripheral body 56 expanding radially outward from the bearing portion 54. Window holes 55 are formed in the outer peripheral body 56 at equal intervals around the input shaft 36. The bearing portion 54 is brought into pressure contact with the clutch gear 49 of the clutch outer 44 in the axial direction of the input shaft 36 by way of a washer 57. The bearing portion 54 is fixed to the input shaft 36 in an axially non-displaceable manner by a nut member 58.

Accommodating portions 61 are formed on the clutch center 45 at positions displaced from the window holes 55 in the peripheral direction. The accommodating portions 61 constrain clutch springs 59 within an imaginary plane orthogonal to the axis of the input shaft 36. The clutch springs 59 are respectively formed of a helical spring. Center axes of the clutch springs 59 are directed in a direction parallel to the axis of the input shaft 36.

Figure 4:
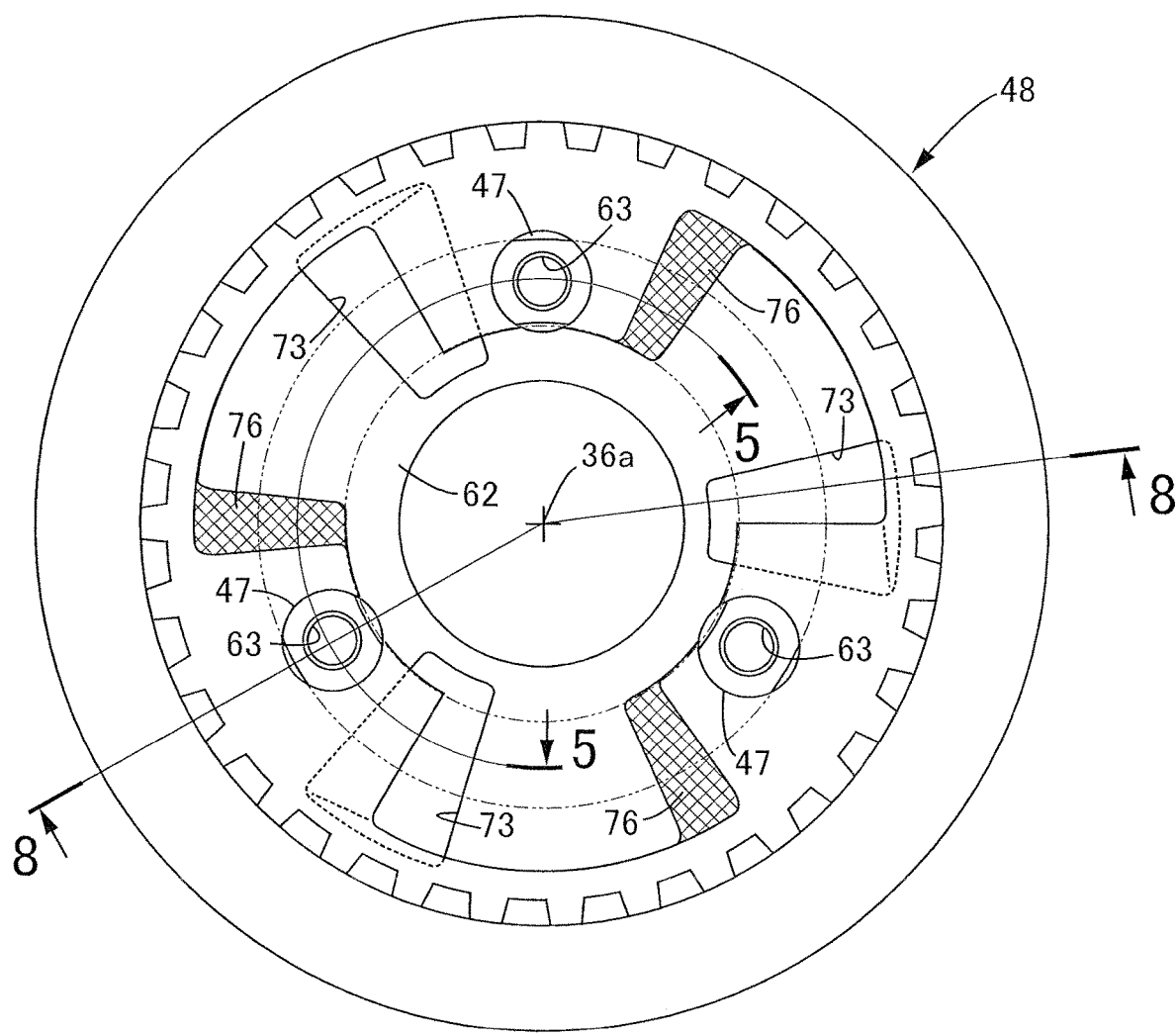
FIG. 4 is an enlarged plan view of a pressure plate.

The pressure plate 48 includes a circular plate element 62 which expands along an imaginary plane orthogonal to the axis of the input shaft 36 and supports the boss portions 47. In the boss portion 47, a threaded hole 63 having a center axis extending parallel to the axis of the input shaft 36 is formed by boring from a tip end of the boss portion 47. As shown in FIG. 4, three threaded holes 63 are disposed in the pressure plate 48 at equal intervals about an axis 36a of the input shaft 36. The boss portions 47 enter the window holes 55 of the clutch center 45 and pass through the outer peripheral body 56 of the clutch center 45. Accordingly, the accommodating portions 61 for the clutch springs 59 are disposed at positions displaced from the boss portions 47 in the peripheral direction.

The multiplate friction clutch 42 includes a clutch lifter 64 which is connected to the pressure plate 48, and applies a driving force to the pressure plate 48 in the axial direction at the time of disconnection between the friction plates 43 and the clutch plates 46. The clutch lifter 64 includes: a clutch lifter plate 66 which is joined to the boss portions 47 using bolts 65 which are threadedly engaged with the threaded holes 63 and is displaceable in the axial direction of the input shaft 36; a lifter rod 67 which is joined to the clutch lifter plate 66 in a rotatable manner about the axis of the input shaft 36 relative to the clutch lifter plate 66; and the lifter drive shaft 21b which is brought into contact with a tip end of the lifter rod 67 thus generating displacement of the lifter rod 67 in the axial direction of the input shaft 36. An outer end of the clutch lifter plate 66 is disposed outside the accommodating portions 61 in the radial direction of the pressure plate 48. An escape portion 69 which is indented in the axial direction of the input shaft 36 and receives the outer end of the clutch lifter plate 66 is formed on the clutch center 45.

A drive surface 71 which is partitioned by at least a plane parallel to the axis of the lifter drive shaft 21b is formed on a tip end of the lifter drive shaft 21b. An end surface 67a of the lifter rod 67 is brought into pressure contact with the drive surface 71. When the lifter drive shaft 21b is rotated about the axis, the lifter rod 67 is pressed toward the tip end of the input shaft 36. In this case, the pressure plate 48 is moved away from the clutch center 45 in the axial direction so that a disconnection state is established between the clutch outer 44 and the clutch center 45. That is, the clutch lifter plate 66 receives a drive force in the axial direction at the time of disconnection between the friction plates 43 and the clutch plates 46. When the clutch cable 21a is pulled, the lifter drive shaft 21b is rotated about the axis.

The clutch springs 59 are sandwiched between the clutch lifter plate 66 and the clutch center 45, and generate an elastic force in a direction that the clutch center 45 and the clutch lifter plate 66 are moved away from each other. In such an operation, the pressure plate 48 is pressed toward the clutch center 45. In this manner, the clutch springs 59 generate an elastic force in a direction that the friction plates 43 and the clutch plates 46 are pressed to each other.

Figure 5:
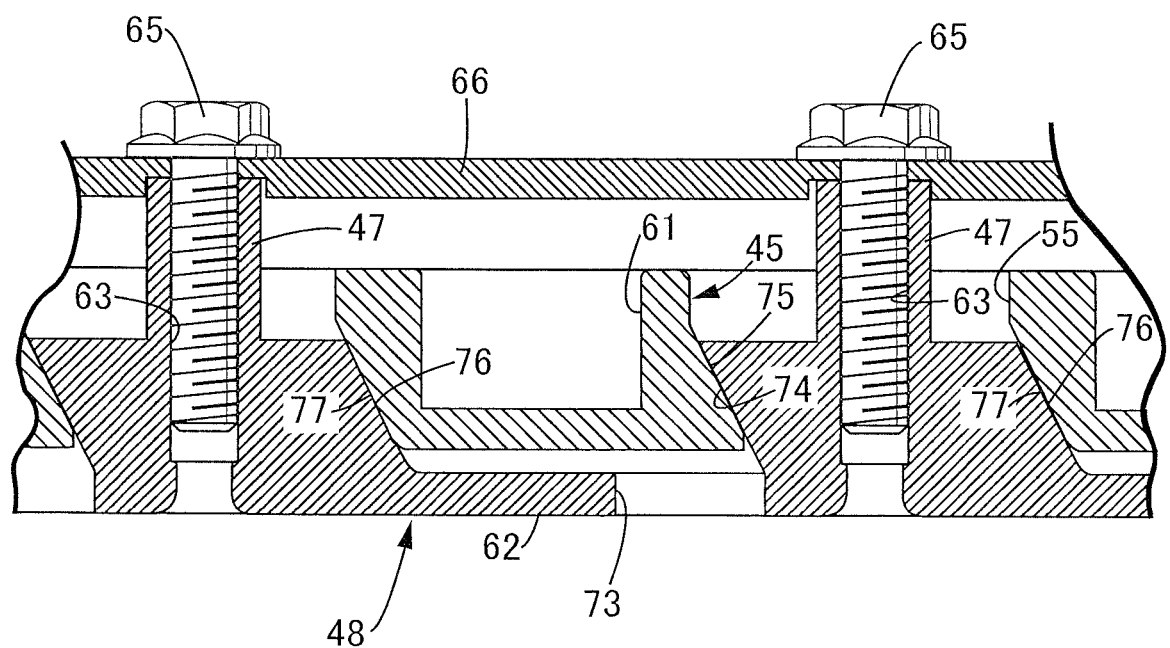
FIG. 5 is an enlarged sectional view of the clutch center and the pressure plate which appear on a cut surface taken along a line 5-5 in FIG. 4.

As shown in FIG. 4 and FIG. 5, openings 73 and cam surfaces 74 are formed on the circular plate element 62 of the pressure plate 48. The openings 73 are disposed at positions displaced from the boss portions 47 in the peripheral direction, and the cam surfaces 74 are made to face the openings 73 in the axial direction of the input shaft 36, and are inclined so as to be away from the clutch springs 59 (accommodating portions 61) in a peripheral direction as the cam surfaces 74 are away from the clutch lifter plate 66 in the axial direction. The cam surfaces 74 configure cam mechanisms which are disposed between the pressure plate 48 and the clutch center 45 thus generating a relative displacement between the pressure plate 48 and the clutch center 45 in the axial direction of the input shaft 36 corresponding to the relative rotation about the axis between the pressure plate 48 and the clutch center 45. The cam surfaces 74 are received by respective planes of inclined surfaces 75 which are disposed in the inside of the window holes 55 and are away from the clutch springs 59 (accommodating portions 61) in the peripheral direction as the inclined surfaces 75 are away from the clutch lifter plate 66 in the axial direction. When a rotational force acts on the clutch lifter plate 66 from the clutch center 45, the relative rotation is generated about the axis between the pressure plate 48 and the clutch center 45 so that the pressure plate 48 is moved away from the clutch center 45 in the axial direction. With such a configuration, a shock in a shift-down operation is attenuated.

On the circular plate element 62 of the pressure plate 48, auxiliary cam surfaces 76 are formed. The auxiliary cam surfaces 76 are made to face the clutch lifter plate 66 in the axial direction of the input shaft 36, and are inclined so as to approach the clutch springs 59 (accommodating portions 61) in the peripheral direction as the auxiliary cam surfaces 76 are away from the clutch lifter plate 66 in the axial direction. The auxiliary cam surfaces 76 are received by respective planes of inclined surfaces 77 which are disposed in the inside of the window holes 55 and approach the clutch springs 59 (accommodating portions 61) in the peripheral direction as the inclined surfaces 77 are away from the clutch lifter plate 66 in the axial direction. When pressing of the clutch lifter plate 66 is released and the pressure plate 48 approaches the clutch center 45 in the axial direction corresponding to an elastic force of the clutch springs 59, the relative rotation is generated about the axis between the pressure plate 48 and the clutch center 45.

Figure 6:
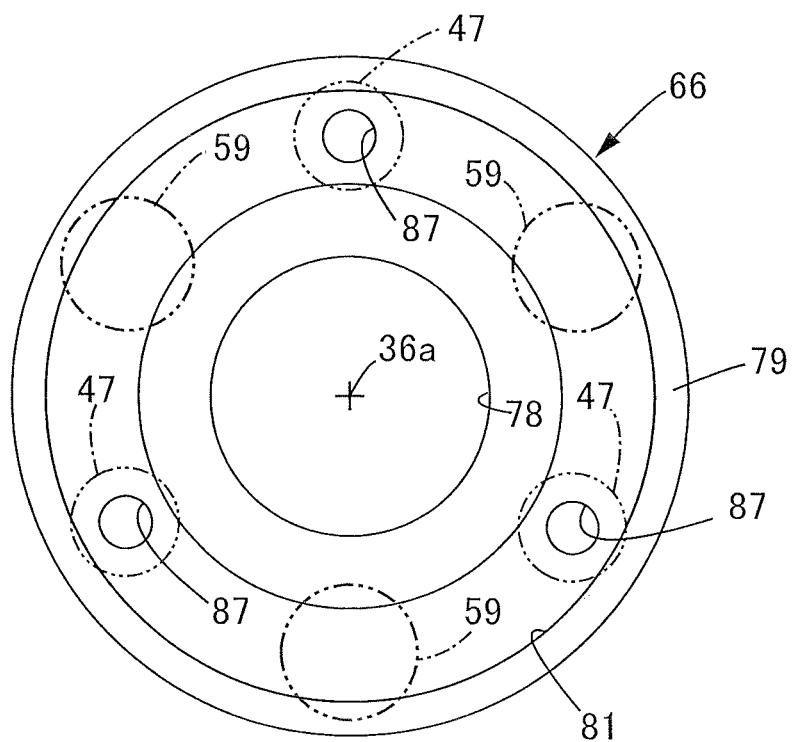
FIG. 6 is an enlarged plan view of a clutch lifter plate.

As shown in FIG. 6, the clutch lifter plate 66 is formed in a circular plate shape. The clutch lifter plate 66 has a bearing hole 78, an annular contact surface 79, and an annular groove 81. The bearing hole 78 defines a cylindrical space coaxial with the input shaft 36 and receives a roller bearing which is mounted on the lifter rod 67. The annular contact surface 79 is defined by a plane orthogonal to the axis 36a of the input shaft 36, expands around the bearing hole 78 in the peripheral direction without interruption, and receives the tip ends of the clutch springs 59. The annular groove 81 is formed on the contact surface 79, extends in the peripheral direction without interruption, and receives the tip ends of the boss portions 47. The contact surface 79 has a width larger than at least a diameter of the clutch spring 59 in the radial direction of the clutch lifter plate 66. An outer edge of the contact surface 79 expands outside outer profiles of the clutch springs 59 in the radial direction. The annular groove 81 has a width smaller than at least a diameter of the boss portion 47 in the radial direction of the clutch lifter plate 66.

Figure 7:
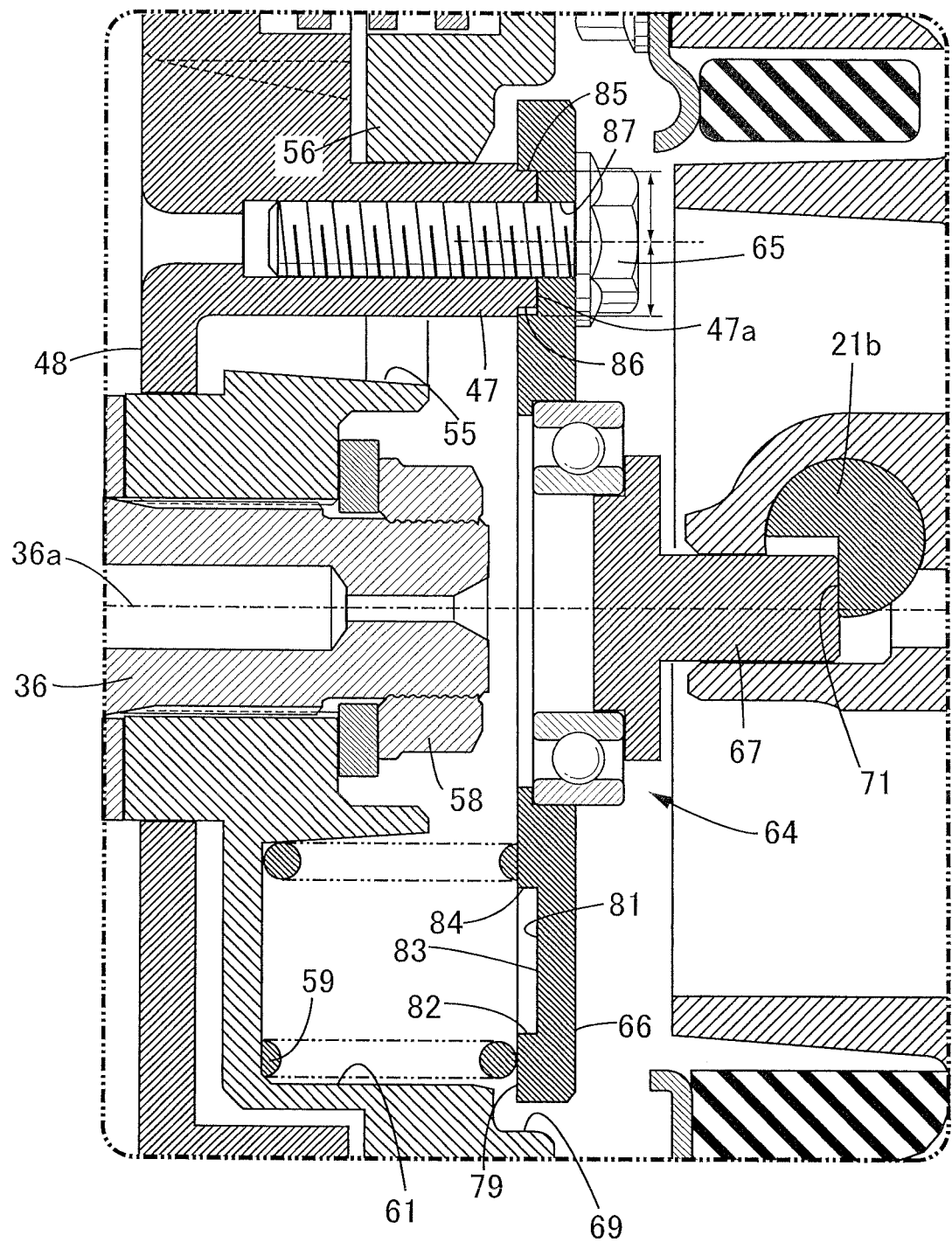
FIG. 7 is an enlarged view of a part shown by an arrow 7 in FIG. 2.

As shown in FIG. 7, the annular groove 81 of the clutch lifter plate 66 includes an outer wall surface 82, a bottom surface 83, and an inner wall surface 84. The outer wall surface 82 is brought into contact with respective boss portions 47 from an outer side in the radial direction of the clutch lifter plate 66 and functions as a position restricting portion for restricting the position of the clutch lifter plate 66 with respect to the pressure plate 48. The bottom surface 83 expands radially inward from the outer wall surface 82 and is brought into contact with tip end surfaces 47a of the boss portions 47. The inner wall surface 84 expands while facing the outer wall surface 82, and faces the boss portions 47 from an inner side in the radial direction of the clutch lifter plate 66. The inner wall surface 84 of the annular groove 81 faces the boss portions 47 with a space formed therebetween. The tip end surfaces 47a of the boss portions 47 are partitioned by a plane orthogonal to the axis 36a of the input shaft 36. An outer side surface 85 and an inner side surface 86 are formed on the tip end surface 47a of the boss portion 47. The outer side surface 85 is continuously formed from the tip end surface 47a, is defined by an imaginary cylindrical plane coaxial with the input shaft 36 on an outer side in the radial direction, and is brought into face contact with the outer wall surface 82 of the annular groove 81. The inner side surface 86 is continuously formed from the tip end surface 47a, is defined by an imaginary cylindrical plane coaxial with the input shaft 36 on an inner side in the radial direction, and faces the inner wall surface 84 of the annular groove 81 with a space formed therebetween. Through holes 87 through which shaft portions of the bolts 65 pass are formed in the bottom surface 83 of the annular groove 81. The through hole 87 defines cylindrical spaces having axes parallel to the center axis of the clutch lifter plate 66.

Figure 8:
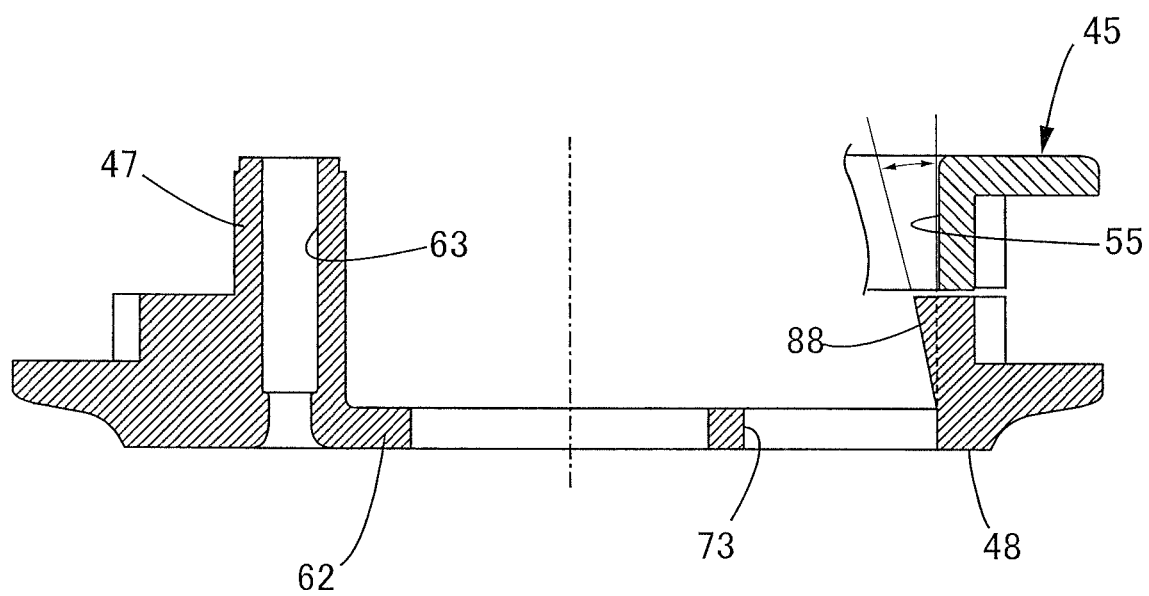
FIG. 8 is an enlarged sectional view taken along a line 8-8 in FIG. 4 of the pressure plate which appears in a cut surface which includes a center axis.

As shown in FIG. 8, oil discharge surfaces 88 are formed on the pressure plate 48. The oil discharge surfaces 88 are continuously formed from edges of the openings 73, and are inclined radially outward as the oil discharge surfaces 88 approach the edges of the openings 73. The oil discharge surfaces 88 are disposed radially inside an outer end of the window holes 55 in the radial direction. The oil discharge surfaces 88 are continuously formed from outer ends in the radial direction of the cam surfaces 74.

Next, the operation of this embodiment is described. In the multiplate friction clutch 42 according to this embodiment, the relative rotation is generated about the axis between the pressure plate 48 and the clutch center 45. When the connection and the disconnection between the clutch outer 44 and the clutch center 45 are switched in response to an operation of the clutch lever, the relative rotation is generated about the axis between the pressure plate 48 and the clutch center 45. At this stage of operation, the clutch lifter plate 66 is fixed to the pressure plate 48 and is rotated together with the pressure plate 48. Meanwhile, the clutch springs 59 are accommodated in the inside of the accommodating portions 61 of the clutch center 45 thus being constrained with respect to the clutch center 45 in a plane orthogonal to the axis 36a of the input shaft 36 and hence, the relative displacement is generated between the clutch lifter plate 66 and the clutch springs 59 about the axis of the input shaft 36. Even when a diameter of the through hole 87 is set larger than the shaft portion of the bolt 65, the outer side surfaces 85 of the boss portions 47 of the clutch center 45 are brought into contact with the outer wall surface 82 of the annular groove 81 thus restricting the displacement of the clutch lifter plate 66. Accordingly, the contact between the contact surface 79 of the clutch lifter plate 66 and the clutch springs 59 can be maintained with certainty when the relative displacement is generated about the axis between the clutch lifter plate 66 and the clutch springs 59.

The outer wall surface 82 of the annular groove 81 is brought into contact with the boss portions 47 from the outside of the clutch lifter plate 66 in the radial direction, and functions as a position restricting portion for restricting the position of the clutch lifter plate 66 with respect to the pressure plate 48. The clutch lifter plate 66 can be positioned with certainty with respect to the pressure plate 48 due to an action of a contact between the outer wall surface 82 of the annular groove 81 and the outer side surfaces 85 of the boss portions 47. Accordingly, in assembling the clutch lifter plate 66, the clutch lifter plate 66 can be brought into contact with and supported (temporary fixing) on the pressure plate 48 at a predetermined position. The outer wall surface 82 of the annular groove 81 is brought into contact with the outer side surfaces 85 of the boss portions 47 from the outside of the clutch lifter plate 66 in a radial direction. Accordingly, the contact surface 79 which expands toward the outside from the annular groove 81 is disposed at a position as close as possible to the axis 36a of the input shaft 36. As a result, it is possible to realize the reduction of a diameter of the clutch lifter plate 66 while sufficiently ensuring a contact area between the clutch lifter plate 66 and the clutch springs 59.

The annular groove 81 of the clutch lifter plate 66 includes: the outer wall surface 82 which is brought into contact with the boss portions 47 from the outer side in the radial direction of the clutch lifter plate 66; the bottom surface 83 which expands radially inwardly from the outer wall surface 82 and is brought into contact with the tip end surfaces 47a of the boss portions 47; and the inner wall surface 84 which expands while facing the outer wall surface 82, and faces the boss portions 47 from the inside in the radial direction of the clutch lifter plate 66. The boss portions 47 of the pressure plate 48 are brought into contact with the outer wall surface 82 and the bottom surface 83 of the annular groove 81 on the outer side surfaces 85 and the tip end surfaces 47a respectively. Accordingly, the clutch lifter plate 66 can be fixed to the pressure plate 48 with certainty in the radial direction and in the axial direction.

The inner wall surface 84 of the annular groove 81 faces the boss portions 47 with a space formed therebetween. The space is formed between the inner wall surface 84 of the annular groove 81 and the inner side surfaces 86 of the boss portions 47. Accordingly, size accuracy can be controlled with high accuracy at the outer wall surface 82 which is brought into contact with the boss portions 47 and, at the same time, a size tolerance range can be loosely set at the inner wall surface 84 and hence, the reduction of a part working cost can be realized.

In the multiplate friction clutch 42 according to this embodiment, the accommodating portions 61 which constrain the clutch springs 59 within a plane orthogonal to the axis 36a of the input shaft 36 are formed on the clutch center 45 at the positions displaced from the boss portions 47 in the peripheral direction, and the outer end of the clutch lifter plate 66 is disposed outside the accommodating portions 61 in the radial direction of the clutch lifter plate 66. Accordingly, when the clutch lifter plate 66 is rotated about the axis together with the pressure plate 48 relative to the clutch center 45, even when the clutch lifter plate 66 is displaced with respect to the clutch springs 59, the clutch lifter plate 66 can continuously support the clutch springs 59 with certainty.

On the clutch center 45, the escape portion 69 which is indented in the axial direction of the input shaft 36 and receives the outer end of the clutch lifter plate 66 is formed. Accordingly, the clutch lifter plate 66 can be made to overlap with the clutch center 45 as much as possible and hence, an assembly formed of the clutch center 45 and the clutch lifter plate 66 can be reduced in size in the axial direction and in the radial direction.

In this embodiment, the pressure plate 48 includes: the circular plate element 62 which expands along an imaginary plane orthogonal to the axis of the input shaft 36, supports the boss portions 47, and has the openings 73 at the positions displaced from the boss portions 47 in the peripheral direction; the cam surfaces 74 which are formed on the circular plate element 62, face the openings 73, and are inclined so as to be away from the clutch springs 59 in the peripheral direction as the cam surfaces 74 are away from the clutch lifter plate 66 in the axial direction; and the oil discharge surfaces 88 which are continuously formed from the edges of the openings 73, and are inclined radially outward as the oil discharge surfaces 88 approaches the edges of the openings 73. When the pressure plate 48 is rotated, oil on the cam surfaces 74 moves radially outward due to an action of a centrifugal force, and flows along the oil discharge surfaces 88 and is discharged to the outside of the pressure plate 48. Along with the movement of oil, dust in the pressure plate 48 is discharged to the outside of the pressure plate 48. The oil discharge surfaces 88 are inclined radially outward as the oil discharge surfaces 88 approaches the edges of the openings 73 and hence, discharging of oil is accelerated. The stagnation of oil and dust in the pressure plate 48 can be prevented.

The clutch center 45 according to this embodiment includes: the outer peripheral body 56 which expands radially outward from the bearing portion 54 fixed to the input shaft 36 and has the window holes 55 which receive the boss portions 47 and the cam surfaces 74 of the pressure plate 48; and the inclined surfaces 75 which are disposed in the window holes 55 and receive the cam surfaces 74 by a plane of the inclined surfaces 75, and the oil discharge surfaces 88 of the pressure plate 48 are disposed radially inside the outer end of the window holes 55 in the radial direction. In general, the wall surfaces which are continuously raised from the element starting from the outer ends in the radial direction of the openings 73 are formed on the pressure plate 48. The wall surfaces are disposed radially outside of the outer ends in the radial direction of the window holes 55 of the clutch center 45, and large inclination is not imparted to the wall surface. Meanwhile, the oil discharge surfaces 88 of the pressure plate 48 according to this embodiment are disposed radially inside the outer ends in the radial direction of the window holes 55 of the clutch center 45 and hence, the oil discharge surfaces 88 have the larger inclination than a conventional case. As a result, discharging of oil is accelerated. The stagnation of oil and dust in the pressure plate 48 can be prevented.

What is claimed is:

1. A multiplate friction clutch comprising:
a clutch outer supported by a rotary shaft in a relatively rotatable manner about an axis, and holds a friction plate in a relatively displaceable manner in an axial direction of the rotary shaft;
a clutch center supported by the rotary shaft in a relatively non-rotatable manner;
a pressure plate assembled to the clutch center in a relatively rotatable manner about the axis and in a relatively displaceable manner in the axial direction, holding a clutch plate, which is brought into contact with the friction plate, in a relatively displaceable manner in the axial direction together with the clutch center, and having a boss portion which penetrates the clutch center;
a cam mechanism disposed between the pressure plate and the clutch center, and capable of generating a relative displacement in the axial direction between the pressure plate and the clutch center in response to a relative rotation about the axis between the pressure plate and the clutch center;
a clutch lifter plate joined to the boss portion and receiving a drive force in the axial direction at a time of disconnection between the friction plate and the clutch plate; and
a spring sandwiched between the clutch lifter plate and the clutch center, and capable of generating an elastic force in a direction that the friction plate and the clutch plate are pressed to each other,
wherein a position restricting portion is provided on the clutch lifter plate, the position restricting portion being brought into contact with the boss portion from an outside in a radial direction of the clutch lifter plate so as to restrict a position of the clutch lifter plate with respect to the pressure plate,
wherein a groove which extends in a peripheral direction of the clutch lifter plate and receives a tip end of the boss portion is formed on the clutch lifter plate, and
the groove has:
an outer wall surface which is brought into contact with the boss portion from an outside in the radial direction of the clutch lifter plate so as to function as the position restricting portion;
a bottom surface which expands radially inward from the outer wall surface, and is brought into contact with a tip end surface of the boss portion; and
an inner wall surface which expands while facing the outer wall surface, and faces the boss portion from an inner side in the radial direction of the clutch lifter plate,
wherein the inner wall surface of the groove faces the boss portion with a space formed between the inner wall surface and the boss portion.

2. The multiplate friction clutch according to claim 1, wherein an accommodating portion which constrains the spring in a plane orthogonal to an axis of the rotary shaft is formed on the clutch center at a position displaced from the boss portion in a peripheral direction, and an outer end of the clutch lifter plate is disposed outside the accommodating portion in the radial direction of the clutch lifter plate.

3. The multiplate friction clutch according to claim 2, wherein an escape portion is formed on the clutch center, the escape portion being indented in the axial direction of the rotary shaft and receiving an outer end of the clutch lifter plate.

4. The multiplate friction clutch according to claim 1, wherein an outer end of the clutch lifter plate is disposed outside the accommodating portion in the radial direction of the clutch lifter plate and an escape portion is formed on the clutch center, the escape portion being indented in an axial direction of the rotary shaft and receives an outer end of the clutch lifter plate.

5. A multiplate friction clutch comprising:
a clutch outer supported by a rotary shaft in a relatively rotatable manner about an axis, and holds a friction plate in a relatively displaceable manner in an axial direction of the rotary shaft;
a clutch center supported by the rotary shaft in a relatively non-rotatable manner;

a pressure plate assembled to the clutch center in a relatively rotatable manner about the axis and in a relatively displaceable manner in the axial direction, holding a clutch plate, which is brought into contact with the friction plate, in a relatively displaceable manner in the axial direction together with the clutch center, and having a boss portion which penetrates the clutch center;

a cam mechanism disposed between the pressure plate and the clutch center, and capable of generating a relative displacement in the axial direction between the pressure plate and the clutch center in response to a relative rotation about the axis between the pressure plate and the clutch center;

a clutch lifter plate joined to the boss portion and receiving a drive force in the axial direction at a time of disconnection between the friction plate and the clutch plate; and a spring sandwiched between the clutch lifter plate and the clutch center, and capable of generating an elastic force in a direction that the friction plate and the clutch plate are pressed to each other, wherein a position restricting portion is provided on the clutch lifter plate, the position restricting portion being brought into contact with the boss portion from an outside in a radial direction of the clutch lifter plate so as to restrict a position of the clutch lifter plate with respect to the pressure plate, and wherein the pressure plate has:
a circular plate element which expands along an imaginary plane orthogonal to the axis of the rotary shaft, supports the boss portion, and has an opening at a position displaced from the boss portion in a peripheral direction;

a cam surface which is formed on the circular plate element so as to configure the cam mechanism, faces the opening, and is inclined so as to be away from the spring in a peripheral direction as the cam surface is away from the clutch lifter plate in an axial direction; and an oil discharge surface which is continuously formed from an edge of the opening and is inclined radially outward as the oil discharge surface approaches the edge of the opening.

6. The multiplate friction clutch according to claim 5, wherein the clutch center has:
an outer peripheral element which expands radially outward from a bearing portion fixed to the rotary shaft and has a window hole which receives the boss portion and the cam surface of the pressure plate; and an inclined surface which is disposed in the window hole and receives the cam surface by a plane of the inclined surface, and the oil discharge surface is disposed radially inside an outer end in a radial direction of the window hole.

* * * * *